United States Patent Office 3,356,513
Patented Dec. 5, 1967

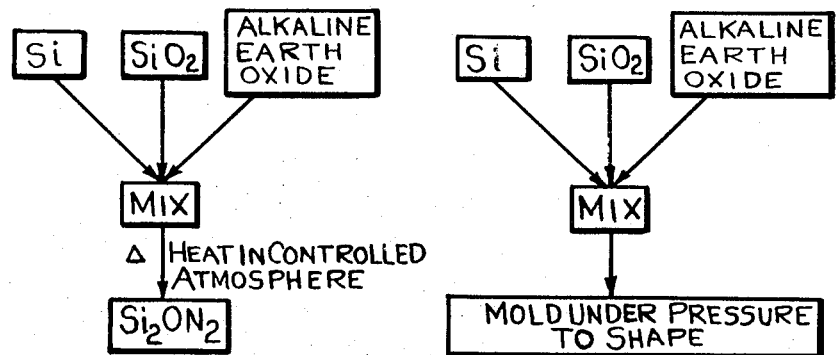
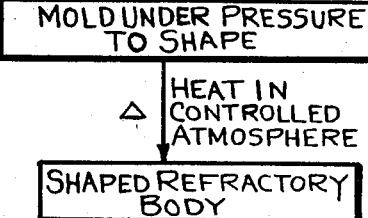
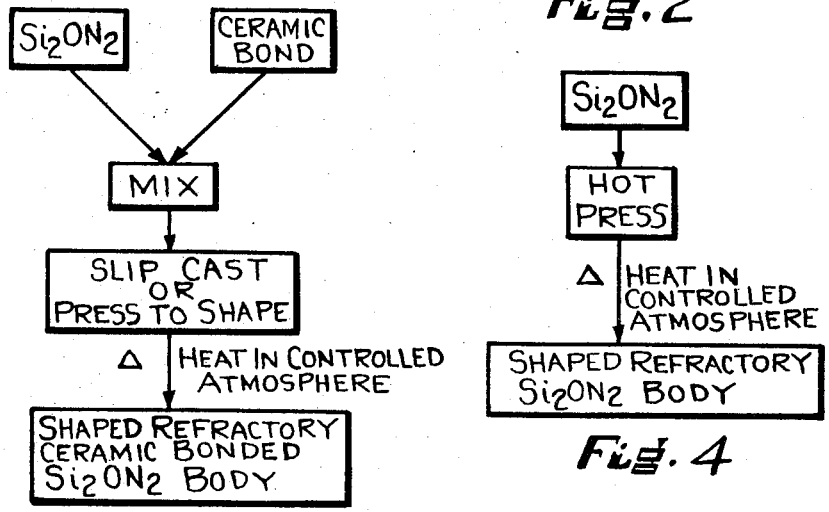

3,356,513
PRODUCTION OF SILICON OXYNITRIDE
Malcolm E. Washburn, Princeton, Mass., assignor to Norton Company, Worcester, Mass., a corporation of Massachusetts
Filed Dec. 20, 1966, Ser. No. 603,248
10 Claims. (Cl. 106—55)

ABSTRACT OF THE DISCLOSURE

Silicon oxynitride, $Si_2ON_2$ is produced by heating a mixture of silica and elemental silicon in a controlled, nitrogen and oxygen containing, atmosphere with alkaline earth oxide as a promoter in the amount of up to 5% by weight. The reactant mix may be molded to shape and then fired, or loose reacted powder may be hot pressed to make refractory bodies having high degree of chemical and thermal stability.

---

This application is a continuation in part of an application of Malcolm E. Washburn, Ser. No. 444,655, filed Apr. 1, 1965.

This invention relates to the production of silicon oxynitride and to bodies in which silicon oxynitride is the principal ingredient, and to the production of such bodies.

My invention includes: (1) an improved process for making silicon oxynitride of relatively high purity in good yields; (2) two methods of making relatively high purity silicon oxynitride bodies; (3) a method of making ceramic bonded silicon oxynitride bodies.

The accompanying drawing summarizes my invention. FIGURE 1 shows a method of producing silicon oxynitride. FIGURE 2 shows a method of producing silicon oxynitride bodies, and FIGURES 3 and 4 illustrate, respectively, a different method for making silicon oxynitride bodies and a method for making ceramic bonded silicon oxynitride bodies.

I have found that silicon oxynitride of suitable purity and in suitable quantity can be economically produced by the high temperature reaction of a mixture of silicon and silicon dioxide in an atmosphere of nitrogen which contains a minor proportion of oxygen. Following from and made possible by this process are the several methods disclosed herein for producing silicon oxynitride bodies, which formerly have not been made.

The synthesis of silicon oxynitride is aided by the use of an additive to the reaction mixture which is selected from the alkaline earth and rare earth oxides. Although the reaction proceeds without the use of this additive, I have found that the presence of such alkaline earth metal oxide in the amount of up to 5 weight percent of the total reaction mix is useful. The preferred amount is 0.3 to 2.5 percent.

Those materials classed as alkaline earths, and ceria and yttria, comprising the group CaO, BaO, MgO, SrO, $CeO_2$, and $Y_2O_3$ or their carbonates can be used to promote the reaction to form silicon oxynitride. The preferred range given above is based on the oxide and slightly larger amounts would be required, based on relative molecular weights, for the carbonates.

The proportion of silica and silicon in the reaction mix has been fround to be very important insofar as quantitative yields of silicon oxynitride product are concerned. Optimum results have been achieved with a silicon to silica weight ratio of about 3 to 1. Thus, in accordance with this teaching, and optimization of the catalyst content, as taught in the preceeding paragraph, an optimal mix, for example, would contain 35 parts of silica, 64.5 parts of silicon, and 0.5 part of calcium oxide, by weight. Small variations from this optimal mix are permissible, thus, as my preferred mix the range may be stated as:

| | Parts by weight |
|---|---|
| Si | 60 to 75 |
| $SiO_2$ | 25 to 40 |
| Alkaline earth metal oxide | 0.3 to 2.5 |

While the operative limits for producing good $Si_2ON_2$ according to the teachings by the invention are:

| | Parts by weight |
|---|---|
| Si | 47.5 to 98 |
| $SiO_2$ | 1 to 50 |
| Alkaline earth metal oxide | Up to 5 |

Control of the firing atmosphere is essential to the operation of my invention in producing silicon oxynitride from the mixture of silica and silicon. Thus, the volume ratio of oxygen to nitrogen must be held within the range of from 1 to 99 up to 6 to 94. Thus, a simple addition of air to nitrogen provides the necessary atmosphere in the furnace, the minor additional impurity gases present in the air exerting no significant harmful effect. Argon, for example, can be deliberately added to the furnace atmosphere without harmful effects. Part or all of the oxygen can be introduced into the furnace in forms such as water vapor, carbon dioxide, carbon monoxide or sulfur dioxide. In special cases, instead of directly controlling the furnace atmosphere, an organic nitrogen compound such as melamine can be added to the reaction mixture and the mass can be fired in normal air atmosphere such as is present in an electrically heated furnace. Where it is desired to produce silicon oxynitride powder, I have achieved good results by firing, at cone 16 in a gas fired furnace, a mixture of silicon, silica, and calcium cyanamide in a confined box. The calcium cyanamide in this case, of course, decomposes to provide both nitrogen and calcium oxide. These addition mix methods of controlling the atmosphere, although not necessarily capable of direct quantitative comparison to the controlled atmosphere containing from 1 to 6% oxygen, are considered to be essentially equivalent to the direct control of the furnace atmosphere in the special cases where such additives do not detract from the quality of the desired product.

In the furnacing of the silicon, silica mixes, I have found that good results are achieved with the following firing cycle:

(1) Free rate of rise to 1,350° C.
(2) Hold at 1,350° C. for 20 hours.
(3) Raise to 1,450° C.
(4) Hold at 1,450° C. for 20 hours.

For moderate sized shapes, such as bars 9 inches by 2¼ inches by 1 inch, and batches of powder, the reaction is not quite complete after 20 hours at 1,350° C. However, after 20 hours at 1,450° C., the reaction is complete. The particle size of the reaction mix influences the necessary firing conditions. I prefer to employ elemental silicon of 200-mesh and finer by U.S. Standard screens. Material that is 250-mesh and finer is better because the reaction proceeds faster, but material that has been ball milled to a size of about 20 microns and finer works best. Ball milling must be carried out in the absence of water to avoid excessive pressure building in the mill. A vehicle such as methylene chloride has been used with success. The silica may be in colloidal form or in the form of quartz, available as ground flint. The flint should be 200-mesh and finer, but better results are obtained if it is 250-mesh and finer. Flint produces articles with higher density than obtained with other silicas.

The above-described process, illustrated by the diagram of FIGURES 1 and 2, can be adapted:

(A) To the production of silicon oxynitride powder for fabrication into shaped articles (1) by hot pressing techniques as illustrated in FIGURE 4, or (2) by ceramic bonding as ilulstrated in FIGURE 3, or the process can be adapted:

(B) To the formation, in situ, of shaped silicon oxynitride bodies as illustrated by the process symbolized in FIGURE 2.

The following is an example of fabrication of a silicon oxynitride body by process B referred to above.

Example I

Technical grade elemental silicon (98.5% Si), 270 grams, which passed a 325 mesh screen, was dry blended with 120 grams of ground flint, which passed through a 325 mesh screen, and 10 grams of powdered calcium oxide. About 20 cc. of water was added and mixed by hand to a semi-dry uniform mixture. This was immediately placed in a steel mold and a bar 9 inches by 2¼ inches by ⅞ inch was pressed at 2½ tons per square inch. The bar was weakly bonded and so was carefully transferred to a drying plate. It was air dried over night and then dried further in an air circulating oven at 180° F. after which is was sealed in a nitrogen atmosphere furnace with other similar items. The furnace chamber internal dimensions were 15½ by 10½ by 10 inches and it was heated by silicon carbide electrical resistance heating elements in the furnace chamber.

The furnace atmosphere was controlled by passing compressed air and nitrogen through valves and individual flow meters, which were calibrated orifices with manometers, into a pressure flask from which the mixture was admitted by a single line into the furnace. The air and nitrogen inputs were adjusted for a 30 percent air, 70 percent nitrogen mixture. A valve on the furnace outlet was adjusted for a total input of 36 liters per hour. The furnace was turned on and the temperature was raised to 1,350° C. in about 6 hours and held for 10 hours after which it was raised to 1,450° C. and held for 20 hours.

The bar was removed after cooling naturally in the furnace. It was well bonded. A small piece of the bar was tested for oxidation resistance by firing in air in an electric furnace at 1,600° C. for 379 hours. Properties of the piece and an adjacent piece not subjected to oxidation are presented in Table I.

*Example I—Properties before and after oxidation*

TABLE I

| | Sample Not Oxidized | Sample After Oxidation |
|---|---|---|
| Density, g./cc. | 1.97 | 2.32 |
| Percent Weight Change | 0 | 18 |
| Percent Volume Change | 0 | 0 |
| Intensity of Selected Peaks of X-Ray Diffraction Patterns: | | |
| 2θ=20.0° $Si_2ON_2$ | 100 | 100 |
| 31.0° $\alpha Si_3N_4$ | 3 | 0 |
| 27.1° $\beta Si_3N_4$ | 0 | 3 |
| 22.0° Cristobalite | 0 | 0 |
| 20.9° Quartz | 0 | 0 |
| 35.6° SiC | 19 | 0 |
| 28.5° Si | 18 | 0 |

The peaks listed are major peaks that were selected for comparison because they are not coincidental with other associated materials. The patterns were run using a copper target on a diffraction unit set at 30 kv. and 10 ma.

Another example of the same fabrication in situ method is as follows:

Example II

The use of a coarse grog as a portion of the mix in pressing shapes for firing is desirable to eliminate pressing laminations and resultant cracking which can occur when an object is pressed from a powder and subsequently fired. This example provides such a grog, and utilizes it in forming a silicon oxynitride body.

The grog was made by blending 5.4 pounds of silicon, which passed a 200-mesh screen, 3.96 pounds of flint passing a 200-mesh screen, and 0.4 pound of powdered calcium oxide. The mix was ball milled in methylene chloride in a porcelain mill for 5 hours. It was dried and mixed with 5 percent by weight of water and pressed into 9 inch by 2¼ inch by 1¼ inch bars at 2½ tons per square inch. The bars were dried and fired in a nitrogen furnace, as in Example I, with a mixture of 25 percent air and 75 percent nitrogen for 15 hours at 1,300° C. These semi-fired bars were crushed and sized to pass through a 6-mesh screen.

Six bricks, 9 by 4½ by 1½ inches, were pressed at 2½ tons per square inch from the following mixture:

| | Parts |
|---|---|
| Grog | 90 |
| Ball milled silicon | 7.25 |
| Ball milled flint | 2.5 |
| CaO | 0.25 |

The bricks were dried and fired at 1,300° C. for 40 hours and at 1,450° C. for 20 hours. The fired bricks were gray and were well bonded. Three bricks were cut in half and the 6 halves and 3 uncut bricks were set up to test thermal conductivity according to A.S.T.M. specification C201–47. The sample brick had a specific gravity of 1.93. Thermal conductivity values (British thermal unit—inches/hour-ft.$^2$-° F.) were as follows:

| ° F: | Thermal conductivity |
|---|---|
| 613 | 36.6 |
| 2382 | 30.2 |
| 1617 | 30.7 |

A half brick of this set, with a specific gravity of 2.00, had a modulus of elasticity of $55 \times 10^{10}$ dynes/cm.$^2$ and a modulus of rupture of 1100 p.s.i. An analysis of the X-ray pattern is shown in Table II.

The following examples, produced according to the method of Example I, show the use of a variety of promoters. All but Example IV were 9-inch bars as in Example I. Example IV was a 6″ x 1½″ x ¼″ bar. Example IX shows a run with the optimum preferred promoter content of 0.5 wt. percent.

TABLE II

| | Ex. III | Ex. IV | Ex. V | Ex. VI | Ex. VII | Ex. VIII | Ex. IX |
|---|---|---|---|---|---|---|---|
| Raw Batch: | | | | | | | |
| Promoter | CaO | BaO | MgO | $SrCO_3$ | None | None | CaO |
| Parts by wt. of Si | 56.9 | 95.0 | 56.9 | 56.9 | 56.9 | 56.9 | 56.9 |
| Parts by wt. of $SiO_2$ | 40.6 | 2.5 | 40.6 | 40.6 | 40.6 | 40.6 | 40.6 |
| Parts by wt. of Promoter | 2.5 | 2.5 | 2.5 | 2.5 | 0 | 0 | .5 |
| X-ray Analysis: | | | | | | | |
| $Si_2ON_2$ (d=4.44) | 100 | 70 | 100 | 100 | 78 | 44 | 93 |
| Oxynitride to nitride ratio | 11.1 | 17.5 | | 33.3 | 3.2 | 2.2 | 18.6 |
| Alpha $Si_3N_4$ (d=2.88) | 0 | 4 | 0 | 3 | 12 | 20 | 0 |
| X-ray Analysis: | | | | | | | |
| Beta $Si_3N_4$ (d=3.29) | 9 | 0 | 0 | 0 | 12 | 0 | 5 |
| Cristobalite (d=4.07) | 0 | 0 | 20 | 0 | 47 | 47 | 0 |
| Si (d=3.13) | 0 | 0 | 0 | 0 | 8 | 7 | 0 |
| SiC (d=2.51) | 3 | 22 | 18 | 8 | 23 | 16 | 0 |
| Percent Nitrogen | 26.5 | 23.3 | 22.5 | 24.8 | 22.02 | 23.2 | 27.4 |

Example X

This is an example of a method of forming a ceramic bonded silicon oxynitride body by slip casting.

Silicon oxynitride powder, six pounds, was made by roll milling a mixture of 72.5 parts by weight of silicon powder, passed through a 200-mesh screen, 25 parts of flint also finer than 200-mesh, and 2.5 parts of calcium oxide, in a glass jar with rubber balls for about 20 hours. The mix was fired in a 25 to 75 air to nitrogen atmosphere for 40 hours at 1300° C. and twenty hours at 1450° C.

A batch of the resulting oxynitride powder was ball milled for 10 hours with methylene chloride to produce a size of about 20 microns. From this batch, 600 grams of dried powder were mixed with 400 grams of Florida kaolin and this was added to a mixture of 20 cc. of clay deflocculant #5 which is an ammonium salt of allyl hydroxycarboxylic acid, and 800 cc. of distilled water. The slip was rolled for about 20 hours.

A 3-inch high x 2 9/16" O.D. x 9/16" wall, tapered crucible was cast from the slip, allowed to dry, and fired for 5 hours at 1250° C. in an electric furnace with an air atmosphere. The fired crucible was buff colored, free of cracks, and exhibited a good ring when struck. The density of the crucible was 1.58 g./cc.

Example XI

Silicon oxynitride powder was prepared by blending 4.35 pounds of 200 mesh silicon, 1.50 pounds of 200-mesh ground flint and 0.15 pound of calcium cyanamide and firing in a semi-confined refractory box in a cone 16 tunnel kiln.

A casting slip was made by mixing 340 grams of the resulting silicon oxynitride powder that had been ball milled with methylene chloride with 60 grams of Florida kaolin. This mixture was added to 300 cc., 0.5 percent aqueous-ammonium alginate solution, 40 cc., 1 percent aqueous acrylic acid polymer (Carbopol 934) and 300 cc. of distilled water.

A tapered crucible 2¼" high x 2⅛" O.D. x 9/16" wall was cast from the slip in a plaster mold, allowed to dry, and fired for 5 hours at 1250° C. The crucible was well bonded and had a density of 1.21 g./cc.

The crucibles of both Examples X and XI were tested for wetting by molten aluminum metal. Pieces of aluminum of 99 percent purity were placed in the crucibles, melted by heating to 800° C. and held for 7 days at that temperature. After cooling and removing, the solidified aluminum could be dropped out of the crucible by turning over and tapping lightly. Slight staining of the crucibles could be observed in a few small spots but no appreciable wetting of the crucibles by the aluminum could be found.

In accordance with the above examples, slip cast items can be made by casting a mixture of silicon oxynitride powder, clay, electrolyte, green binder, and water in plaster molds using conventional slip casting techniques. A clay such as a ball clay or kaolin may be used. A clay deflocculant such as an ammonium salt of allyl hydroxycarboxylic acid or an electrolyte such as an acrylic acid polymer, and binders such as sodium or ammonium alginate may be used. Good slip cast items can be made from mixtures of silicon oxynitride and clay in the following ranges:

| | Percent by weight |
|---|---|
| $Si_2ON_2$ | 60 to 99 |
| Clay | 1 to 40 |

The following is an example of the method of forming silicon oxynitride bodies by hot pressing a particulate mass of silicon oxynitride.

Example XII

A piece of the bar of Example I, weighing about 20 grams, was crushed to pass through a 100-mesh screen after which it was placed in a porcelain ball mill, dry; and milled for 6 hours to a finely divided light gray powder, 17 grams of which were put into a graphite mold. The mold was placed in an induction furnace and pressed at 1700° C. at 6000 p.s.i. for 13 minutes.

The product was 1⅛ inches in diameter and ⅜ inch thick. Its density was 2.7 g./cc. which is 95% of the true density of 2.85 g./cc. measured on some finer than 200-mesh powder crushed from the sample. The literature cites the theoretical density as 3.1 g./cc. Articles of greater than 85% of theoretical density are made by this method. This example is 87% of theoretical density. The Knoop hardness was 1580. The material may be hot pressed at temperatures from 1500 to 1900° C., pressures of from 1 to 20 tons per square inch, for times of from 2 to 40 minutes.

It has been found that oxynitride made by the addition of the various alkaline earth promoters can be hot pressed to form articles that are denser or harder than those that do not have an added promoter.

The following examples were hot pressed together in a multicavity mold at 1700° C. with a pressure of 6000 p.s.i. for 34 minutes. The specimens were ½" diameter by approximately ½" high.

TABLE III

| | Ex. XIII | Ex. XIV | Ex. XV | Ex. XVI | Ex. XVII |
|---|---|---|---|---|---|
| Promoter | CaO | CaO | MgO | $SrCO_3$ | None |
| Weight percent | .5 | 2.5 | 2.5 | 2.5 | |
| Density (g./cc.) | 2.68 | 2.69 | 2.62 | 2.69 | 2.52 |
| Hardness by SBP (mm.) | .022 | 0.71 | 0.15 | 0.02 | 1.13 |

Hardness is measured by a sand blast penetration test in which a measured quantity of quartz sand is blasted from a chamber onto the sample with an air pressure of 25 p.s.i. for 30 seconds. The figure given is the value of depth of the hole that was blasted out in millimeters. Two blasts were made in the same hole and the value is that of the second blast. The first blast removed a small formation of skin from the surface of the article.

The following examples were made together in a multicavity mold at a slightly higher temperature of approximately 1720° C. with a pressure of 6000 p.s.i. for 20 minutes.

TABLE IV

| | Ex. XVIII | Ex. XIX | Ex. XX |
|---|---|---|---|
| Promoter | CaO | CaO | None |
| Weight Percent | 2.5 | 1.0 | |
| Density (g./cc.) | 2.72 | 2.72 | 2.68 |
| Hardness by SBP (mm.) | 0.01 | 0.00 | 0.33 |

The X-ray analysis and nitrogen analysis of the various products are listed below:

TABLE V

| Constituent | 2θ (deg.) | d (A°) | Relative Intensity | | | | | |
|---|---|---|---|---|---|---|---|---|
| | | | Ex. II | Ex. X Before Al Test | Ex. X After Al Test | Ex. XI Before Al Test | Ex. XI After Al Test | Ex. XII |
| $Si_2ON_2$ | 20.0 | 4.44 | 86 | 39 | 40 | 75 | 69 | 85 |
| Alpha-$Si_3N_4$ | 31.0 | 2.88 | 15 | 13 | 13 | 7 | 3 | 0 |
| Beta-$Si_3N_4$ | 27.1 | 3.29 | 8 | 20 | 18 | 9 | 7 | 6 |
| Cristobalite | 22.0 | 4.07 | 5 | 100 | 100 | 100 | 100 | 0 |
| Si | 28.5 | 3.13 | 0 | 0 | 2 | 24 | 23 | 0 |
| SiC | 35.6 | 2.51 | 21 | 23 | 22 | 27 | 21 | 16 |
| Percent Nitrogen (wet chemical analysis) | | | 26.8 | 13.2 | 13.6 | 13.2 | 13.4 | 24.4 |

When silicon without silica and alkaline earth oxide promoter is fired in a nitrogen atmosphere containing some oxygen, oxynitride may form; however, the predominating phase is silicon nitride $Si_3N_4$ of either the alpha or beta form. Likewise, when a mixture of silicon and silica with or without the promoter is fired in a nitrogen atmosphere with no or very little oxygen present, the predominating phase is also silicon nitride, $Si_3N_4$.

I hypothesize that the combination of silicon and silica with nitrogen and oxygen is required in order to get a good formation of silicon oxynitride. This may not be specifically true, however, and other similar combinations not investigated may produce equally as good results.

The addition of calcium oxide or alkaline earth oxide promotes the reaction to form oxynitride. As the amount of promoter is increased up to an optimum amount, the ratio of the X-ray peaks of oxynitride ($d=4.44$) to alpha nitride ($d=2.88$) increases, as is shown by the data of Table II.

I speculate that the reaction to form oxynitride occurs in three different ways and my best formulation of ingredients gives an optimum combination of these three reactions to form a higher yield of oxynitride than would be found by each individual reaction. This speculation is based on assumptions which I feel are valid but my invention should not be limited by this speculation since other theories may be possible.

The first reaction is through the combination of silicon and nitrogen to form an unstable combination of silicon and nitrogen which is in a "chicken wire" like configuration with alternating atoms of silicon and nitrogen.

(1) $\quad\quad\quad\quad Si+N \rightarrow SiN$

Oxygen then may combine directly with the silicon of this unstable network and link a similar network to it, acting as a bridge between the two configurations.

(2) $\quad\quad\quad 2SiN + \tfrac{1}{2}O_2 \rightarrow Si_2ON_2$

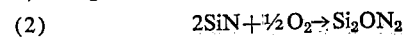
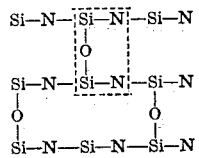

Nitrogen may also combine in a similar fashion, but involves three SiN units and results in the formation of silicon nitride.

(3) $\quad\quad\quad 3SiN + \tfrac{1}{2}N_2 \rightarrow Si_3N_4$

This reaction may be visualized as follows:

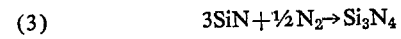
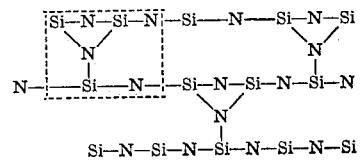

The second method of combination involves the formation of silicon monoxide in a gaseous form which combines with the SiN network shown as Reaction 1 as follows:

(4) $\quad\quad\quad\quad Si+SiO_2 \rightarrow 2SiO$ (5) $\quad\quad\quad\quad SiN+SiO \rightarrow Si_2ON$ (6) $\quad\quad\quad Si_2ON + \tfrac{1}{2}N_2 \rightarrow Si_2ON_2$ The mechanism can be visualized:

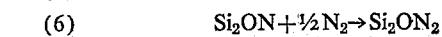

Nitrogen combines to form the oxynitride which then may combine with another $Si_2ON$ unit, as follows:

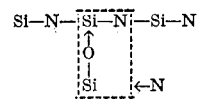
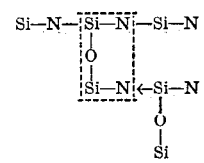

The third method of combination involves the use of CaO as a promoter with a reaction between CaO and SiN taking place as follows:

(7) $\quad\quad\quad SnN+CaO \rightarrow N-Si-O-Ca$

The calcium complex is unstable and may consequently react as follows:

(8) $\quad\quad N-Si-O-Ca+SiO \rightarrow Si_2ON+CaO$

The $Si_2ON$ unit may then react as shown in Equation 6. The CaO may react with another SiN part of the basic network or combine with excess $SiO_2$ in the system to form calcium silicate.

I feel that most of the oxynitride forms by Reactions 4, 5 and 6 along with 7 and 8 under the preferred conditions described in this disclosure. The fact that a high oxynitride yield can be obtained indicates that the mechanisms shown by Reactions 2 and 3 probably do not occur to a large degree under the preferred conditions since both Reactions 2 and 3 can probably take place simultaneously.

Reactions 2 and 3 do ilustrate, however, that the formation of these compounds start off with the formation of a basic unit which is the same for each case. What must be controlled, is the bridging action between these basic unit layers. The mechanism shown here shows that the second stage of reaction involves a gaseous phase which builds upon the basic unit. This concept avoids the problem of a three-body collision.

The reactions appear to be that of a gas building onto a solid network. This is demonstrated experimentally by the fact that no oxynitride forms outside the physical dimensions of the bulk of the mixture which could only happen if the oxynitride formed as a result of two gases combining at the same instant.

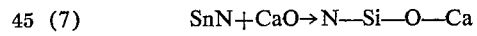

I claim:
1. A process for making silicon oynitride, $Si_2ON_2$, comprising:
   (a) providing a mixture of 47.5 to 98 parts by weight of elemental silicon, 1 to 50 parts by weight of $SiO_2$ and a source of up to 5 parts by weight of an oxide selected from the group consisting of BaO, CaO, MgO, SrO, $CeO_2$, and $Y_2O_3$;
   (b) firing the mixture to at least 1350° C. in a mixture of oxygen and nitrogen in which the ratio of oxygen to nitrogen is from 1 to 99 to 6 to 94 parts by volume.

2. A process as in claim 1 where an alkaline earth metal calcium cyanamide is employed as a source of CaO.

3. A process for making silicon oxynitride comprising:
   (a) providing a mixture of 60 to 75 parts by weight of silicon, 25 to 40 parts by weight of silicon dioxide, and 1 to 5 parts by weight of a source of an oxide selected from the group consisting of BaO, CaO, MgO, SrO, $CeO_2$ and $Y_2O_3$;
   (b) firing the mixture in an atmosphere of 94 to 99 parts by volume of nitrogen and a source of 1 to 6 parts of oxygen for a time and at a temperature to produce silicon oxynitride.

4. A method according to claim 1 in which the $SiO_2$ is in the form of quartz.

5. A method according to claim 1 in which the particle size of the mix is 200-mesh and finer.

6. A method according to claim 1 in which the particle size of the mix is 20 microns and finer.

7. A method for producing shaped bodies of silicon oxynitride comprising subjecting a mass of finely divided silicon oxynitride containing from 0.3 to 5 weight percent of an alkaline earth oxide to a temperature of from 1500 to 1900° C. and a pressure of from 1 to 20 tons per square inch in a mold for a time of from 2 to 40 minutes sufficient to mechanically bond the mass through sintering.

8. A refractory body consisting of from 60 to 99% silicon oxynitride and from 1 to 40% clay, by weight.

9. The method according to claim 1 in which the mixture is fired for at least 20 hours.

10. A method as in claim 1 in which the mixture is molded to a predetermined desired shape prior to firing.

References Cited
UNITED STATES PATENTS
2,968,530    1/1961    Forgeng et al. _____ 23—203

ROBERT F. WHITE, *Primary Examiner.*

J. A FINLAYSON, *Assistant Examiner.*